United States Patent [19]

Reimer

[11] Patent Number: 5,167,110
[45] Date of Patent: Dec. 1, 1992

[54] ONE PASS BEAN CUTTING AND WINDROWING APPARATUS

[76] Inventor: Peter Reimer, P.O. Box 571, Shafter, Calif. 93263

[21] Appl. No.: 702,772

[22] Filed: May 17, 1991

[51] Int. Cl.$^5$ .............................................. A01D 46/00
[52] U.S. Cl. .................................................. 56/327.1
[58] Field of Search ................ 56/14.3, 13.6, 327.1

[56] References Cited

U.S. PATENT DOCUMENTS

| | | | |
|---|---|---|---|
| 3,521,710 | 7/1970 | Tillatson | 171/61 |
| 3,527,304 | 9/1970 | Wilde et al. | 171/28 |
| 3,800,879 | 4/1974 | Chant | 56/229 X |
| 4,090,568 | 5/1978 | Johnson | 56/327.1 X |
| 4,156,465 | 5/1979 | Porter | 171/14 |
| 4,507,911 | 4/1985 | Wolf et al. | 56/327.1 |
| 4,550,554 | 11/1985 | Lundahl et al. | 56/294 |
| 4,697,406 | 10/1987 | Whitley | 56/327.1 |
| 4,927,440 | 5/1990 | Butler et al. | 56/12.8 |

*Primary Examiner*—Terry Lee Melius

*Attorney, Agent, or Firm*—Frank J. Dykas; Craig M. Korfanta; Ken J. Pedersen

[57] ABSTRACT

Disclosed is a combination bean cutter-windrower (10) which includes a cross bar (11) being attached to the bottom of windrower (2) and located just behind tine pickup reel (3) under roller (5) and conveyors (6) and (7). A plurality of shanks (12) are attached to cross bar (11) and extend therefrom, mostly forward and slightly downward to points below and ahead of pickup reel (3). The front ends of each shank (11) have a blade (14) extending generally horizontally outward therefrom to cut the plants just prior to the pickup reel (11) lifting them up. A pair of row dividers (15) are provided on the right and left sides of the machine. These dividers are hydraulically rotated to aid in separating the entangled vines without damaging the crop. Each divider (15) rests on a skid plate (19) and is disposed to ride in one of the two outer most furrows to separate the entangled vines of the two drill rows adjacent the furrows.

6 Claims, 4 Drawing Sheets

ONE PASS BEAN CUTTING AND WINDROWING APPARATUS

BACKGROUND OF THE INVENTION

1. Technical Field

This invention generally relates to agricultural equipment for vine crop harvesting and more particularly, this invention relates to a single pass windrowing bean harvester for dry bean processing.

2. Background Art

Currently, the preferred method in dry bean production is to harvest the bean plants by cutting the plant off above the roots and then bunching the plants into windrows for drying by the sun and wind by evaporation. Once the plants are dry, the beans are separated from the dried plant by a bean combine for further processing and/or packaging.

Beans are usually grown in long parallel drill rows or mounds approximately 20 to 40 inches apart, each separated from the other by trenches or furrows. By the time the plants are full grown and the beans are ready for harvesting, the furrows are overgrown with the vines of the plants. To reduce damage to the beans and help prevent a significant crop loss the vines must be carefully cut just below ground level prior to harvesting.

One prior art apparatus for harvesting cucumbers is taught by WILDE ET. AL. in U.S. Pat. No. 3,527,304. This patent teaches a combination vine cutter and harvesting apparatus. A long V-shaped knife blade is positioned ahead of the harvester just below ground level to sever the plants just above the root. The harvester then uses a vine-elevating device, consisting of tines and small conveyor belts, to pickup the cucumber laden vines. These vines are then passed through a pair of picking rollers to separate the cucumbers from the vine. Unfortunately, this apparatus is not suited for harvesting and/or windrowing beans.

With current technology, the most economically efficient method for harvesting beans uses a three pass technique. The first trip through the field is done with a tractor equipped with a plurality, usually four to twelve, horizontal cutting blades secured to vertical shanks to sever the vines from the root. However, because the vines are intertwined, they will oftentimes entangle the shanks and bring the operation to a halt. To counteract this problem, the shanks are positioned in pairs, side by side, with one blade extending horizontally out to cut the plants in the right drill row and another blade extending from the other shank to cut the plants in the left drill row. The pairs are positioned in every other furrow. A row divider is positioned directly ahead of each shank pair and in front of the tractor wheels to separate the vines and prevent them from becoming entangled in the shanks or run over by the tractor. The row dividers generally consist of a vertical sickle or an angled roller on top of a skid shoe which slides in the furrow trough.

The second pass has a bean windrower either pushed or pulled by a tractor which gathers the plants from the cut rows into one larger row for drying in the wind and sun. The windrower generally has a rotating horizontal pickup reel which includes a plurality of tines or fingers. The tines extend radially out from the pickup reel between stationary arcuate ribs. These ribs, or vine guides, act to remove the vines from the tines and direct them over a single horizontal roller to separate out any dirt. The vines then pass onto a transverse conveyor belt directly behind the pickup reel. Depending upon the configuration of the windrower, the vines are either conveyed to a center drop area, if the windrower incorporates two conveyor belts, or out an end drop area if the windrower uses a single conveyor. In either case, windrows are formed in which the plants are allowed to dry.

The third pass uses a bean combine to pickup the windrows and separate the beans from the dried vines. This is accomplished using standard combine technology which generally has a horizontal paddle wheel feeding the crops to a pair of picking rollers which separate the beans from the vine.

There are several problems with this method which up until now have simply been accepted as part of the business. Firstly, the process requires three separate passes which means extra man power and time, extra wear and tear on the machinery and high fuel consumption. A second problem is the relatively high percentage of crop loss as a consequence of the row dividers cutting or pulling the crop resulting in the bean pods falling uselessly to the ground. A third problem is related to the relatively long length of the knife blades. These blades are quite expensive and require a significant amount of power to push them through the drill rows.

What is needed is a device for cutting and windrowing beans in a single pass over the field which is not plagued with the drawbacks of the prior art. Objects of the present invention include providing a single pass bean cutter-windrower which reduces the amount of fuel and energy necessary to accomplish the cutting and windrowing of beans, reduces crop loss and damage due to excessive handling, reduces the time and man power necessary to cut and windrow a bean crop, and which is inexpensive to purchase, maintain and operate than previously available.

DISCLOSURE OF INVENTION

These and other objects are accomplished by a combination bean cutter-windrower which incorporates the addition of several elements and improvements to a standard windrower. The windrower is similar to those presently on the market but is built to accommodate extra machinery. A cross bar is attached to the bottom of the windrower and is located just behind the tine pickup reel under the rollers and the conveyors. A plurality of shanks are attached to the cross bar and extend therefrom, mostly forward and slightly downward to points below and ahead of the pickup reel. The tips of each shank have a single blade extending generally horizontally outward therefrom to cut the plants just prior to the pickup reel lifting them up.

Because the crop is removed ahead of where the shanks are attached, there is no need to divide the rows and the blade can be positioned coincident with the drill row, unlike the prior art which required the longer blades. As a consequence, the blades are much less expensive to manufacture and require less power to push them through the soil. Additionally, since the whole machine is pushed ahead of the tractor it is not necessary to divide the rows for the tractor wheels. However, a pair of row dividers are provided on the outside of the swath path to prevent vines from the adjacent swath path from being damaged. These dividers each have a hydraulically actuated roller disposed at an incline and resting on a skid plate. The two dividers are positioned to ride in the outer two most furrows. By eliminating the row dividers in every other row, unnecessary handling of the crop is eliminated resulting in much higher harvest yield.

Guidance of the machine is assisted by elongated skids and support-guidance wheels spaced to run in the furrows. Support-guidance wheels are attached to the cross bar directly under the conveyors to provide support since the load is so far in front of the tractor and to provide additional guidance for the device. Optionally, an electronic guidance system has been used which senses the sides of the two outermost furrows via follower disks and activates a hydraulic steering mechinism.

BEST MODE FOR CARRYING OUT INVENTION

Figure 1:
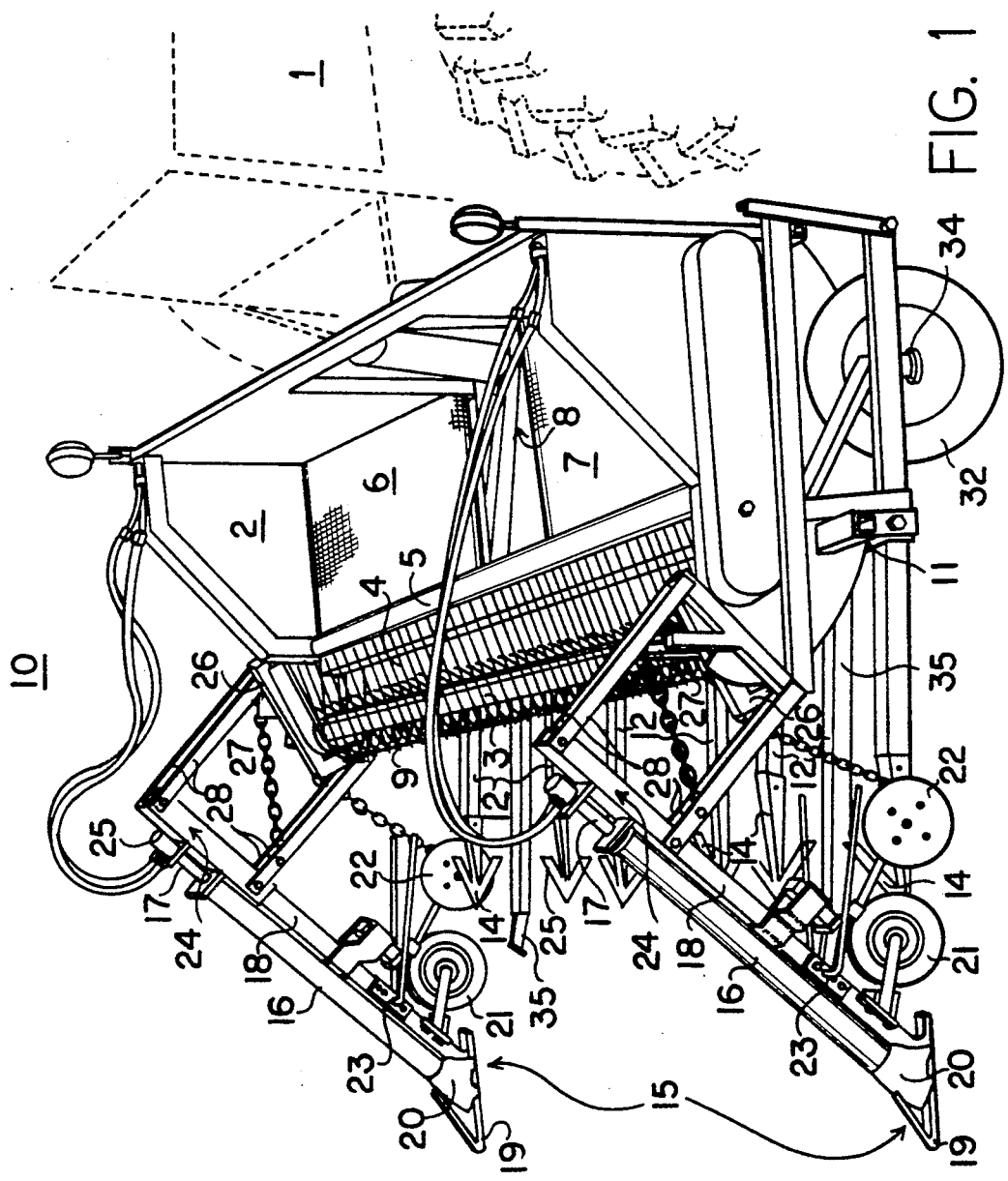
FIG. 1 is a three quarter side elevation view of the combination bean cutter-windrower.
Figure 2:
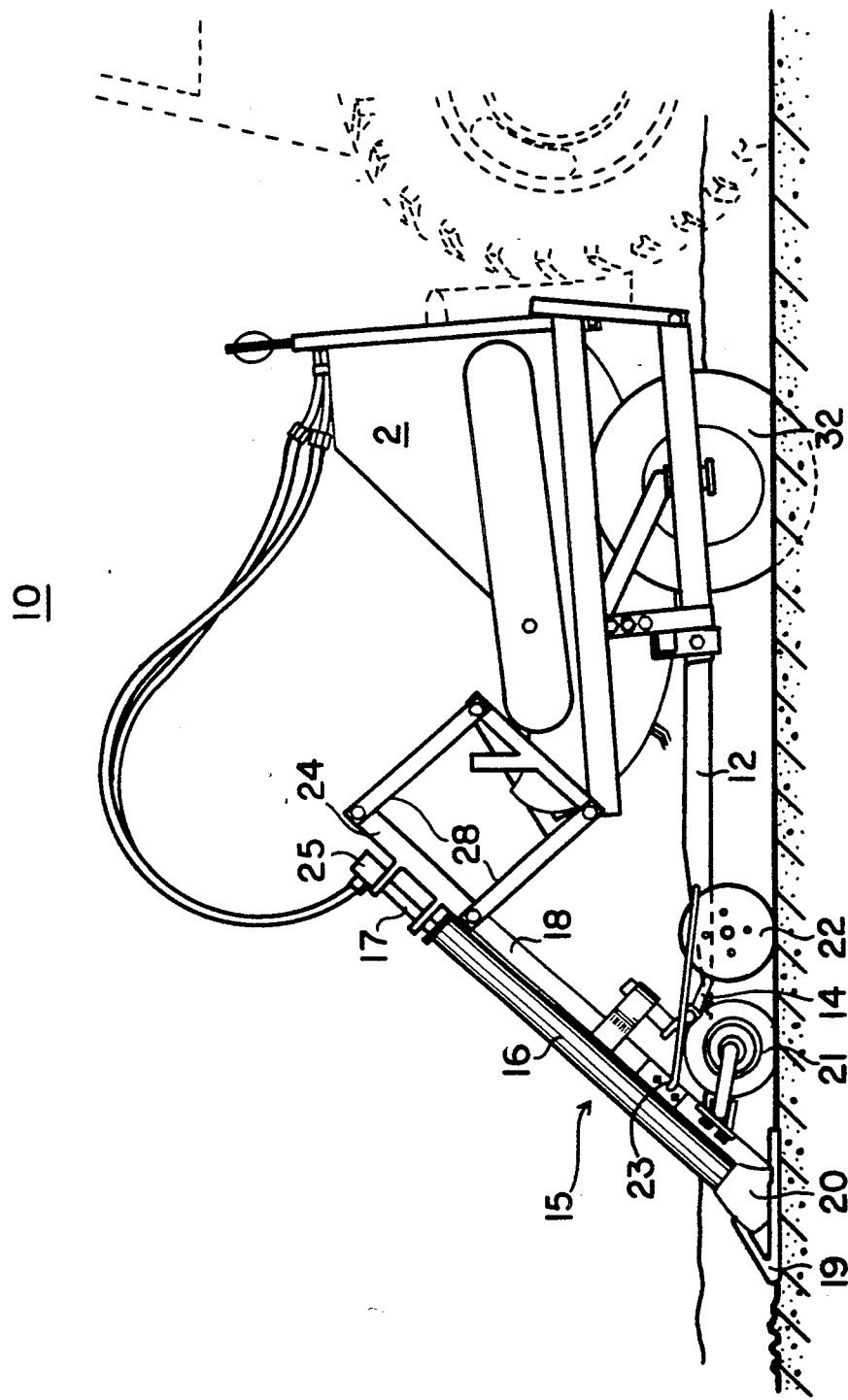
FIG. 2 is a side view of the bean cutter-windrower in the harvesting position.
Figure 3:
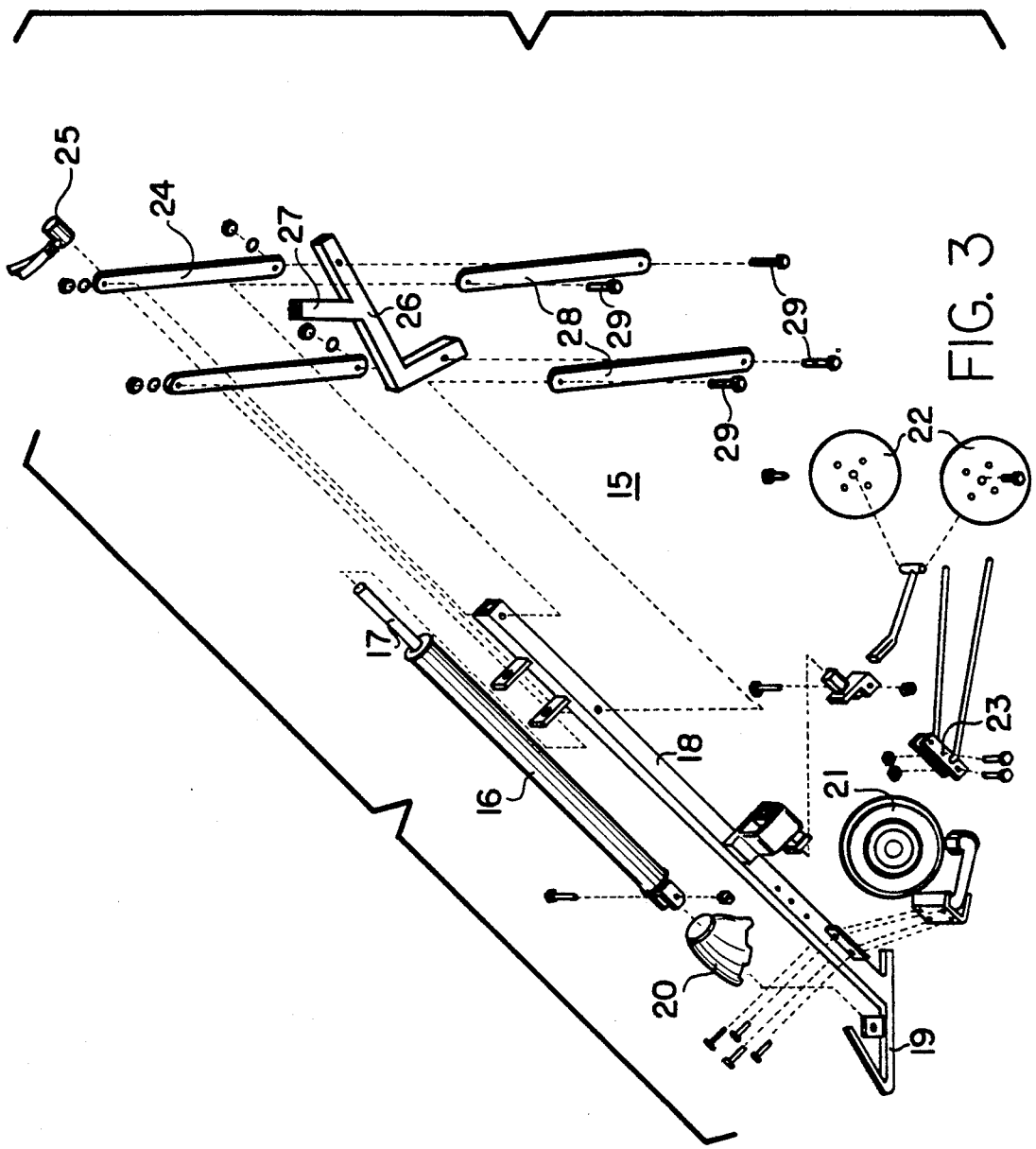
FIG. 3 is an exploded assembly drawing of a knife shank and blade.
Figure 4:
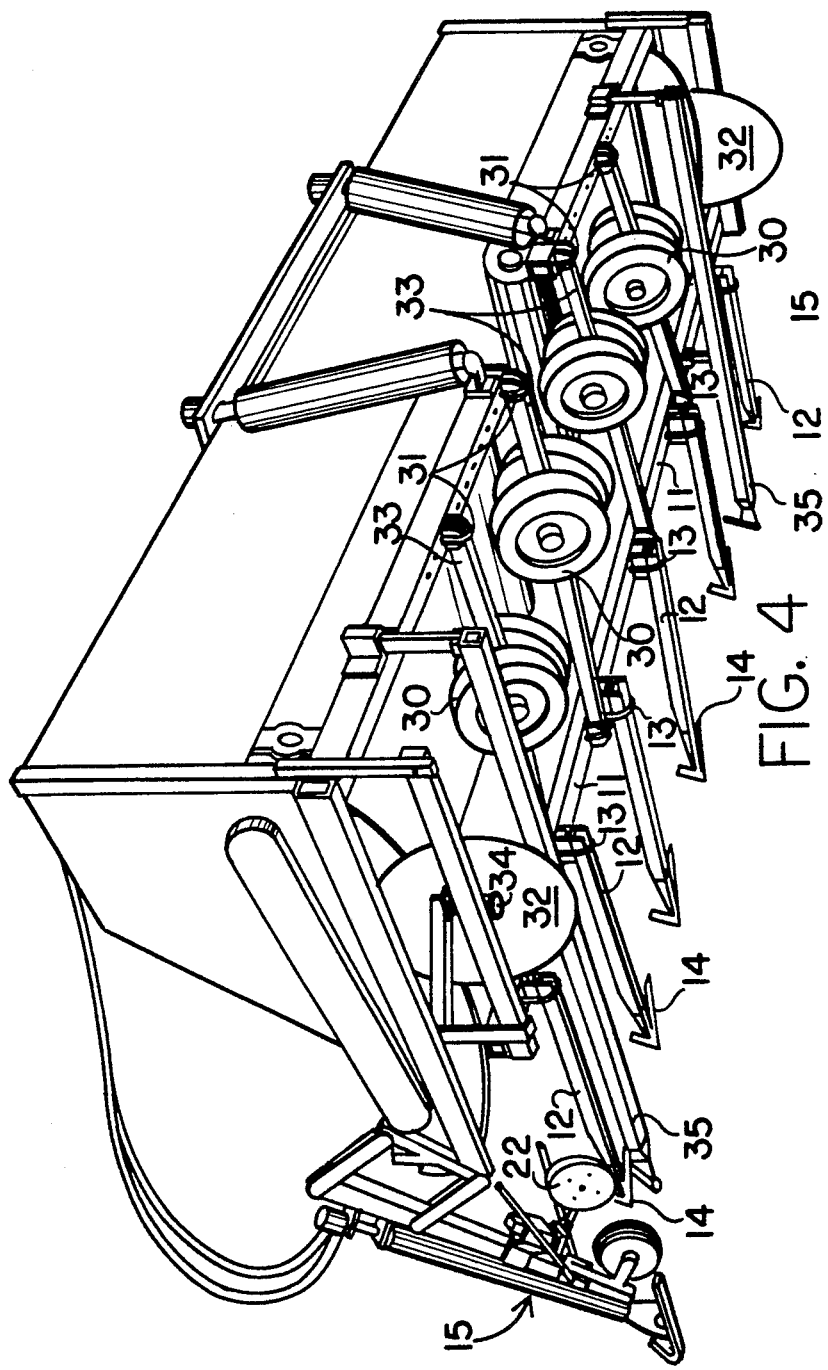
FIG. 4 is a bottom perspective view of the bean cutter-windrower showing the cross bar, shanks, skids, cutting blades, low profile rollers and support wheels.

Referring now to FIGS. 1 through 4 the details of combination vinecutter and windrower 10 are shown. Combination vine cutter and windrower 10 incorporates a modified push type bean windrower 2 mounted on a suitable tractor 1. Bean windrower 2 uses horizontal pickup reel 3 having thereon a plurality of radially disposed tines 9. Tines 9 act to engage and lift the vines from the ground as pickup reel 3 rotates against the forward travel of tractor 1. A plurality of arcuate ribs or vine guides 4 are fixed about pickup reel 3 and act to separate the vines from the reel and direct the vines on to the conveyor belts of windrower 2. The vines are passed over a separator roller 5 which acts to separate any dirt from the vines. The vines are then directed on to either right conveyor belt 6 or left conveyor belt 7, both of which travel toward centrally located windrow drop chute 8. Consequently, the vines harvested from a plurality of drill rows are gathered and deposited in one long pile or windrow.

Combination vine cutter and windrower 10 has a cross bar 11 suspended below conveyor belts 6 and 7 for the attachment of blade shanks 12 and main guide wheels 30. Blade shanks 12 are attached to cross bar 11 via adjustable position shank brackets 13. The brackets are attached with U bolts such that their position along cross bar 11 is adjustable to align shanks 12 with individual drill rows. Blade shanks 12 are disposed to extend forward and slightly downward to points in front of and below pickup reel 3.

The forward most end of each shank 12 has attached thereto a horizontally disposed cutting blade 14. Cutting blades 14 are removably bolted to the front ends of blade shanks 12 to provide for easy removal and replacement. Additionally, cutting blades 14 are configured to present an angled cutting edge to sever the vines from their lower root structure.

A pair of row dividers 15 are provided to separate the vines from the drill rows adjacent the two outside furrows. Row dividers 15 generally have hydraulically actuated angled rollers 16 rotatably attached atop skid plates 19. Each skid plate 19 is attached to an elongated separator frame member 18 and is configured to ride in the trough of the furrow. A skid shoe 20 covers the interface between roller 16 and skid plate 19 and acts as a protective cowling for deflecting dirt, vines and other debris.

Divider support frame 24 is composed of elongated separator frame member 18, side strap frame members 28, frame attachment member 26 and separator frame member 18. Frame attachment member 26 is generally welded or otherwise permanently affixed to bean windrower 2. Two pair of side strap frame members 28 are pivotally attached at opposing ends of frame attachment member 26, using pivot bolts 29, to elongated separator frame member 18 as is shown. A hinge stop bar 27 extends angularly upward from frame attachment member 26 and acts to limit the angular displacement of side strap frame members 28, thereby limiting the downward displacement of row dividers 15. A rotating shaft 17 connects angled rollers 16 to their respective hydraulic motors 25. Hydraulic motors 25 rotate angled rollers 16 to separate the entangled vines as gently as possible.

Each separator frame member 18 has a divider guidance wheel 21 rotatably attached proximate its lower end. A V-shaped vine guide 23 is attached to each separator frame member 18 and has an arm disposed on either side of divider guidance wheels 21 to deflect vines back and away from guidance wheels 21. In this embodiment, a pair of elongated skids 35 act as a passive mechanical guidance means, however it should be noted that any number of skids could be employed. This is necessary to support and counter act the inertia of the large floating mass in front of the tractor, i.e. combination vine cutter and windrower 10.

Optionally, an electronic guidance system can be used to aid the operator in maintaining straight path through the field. Here, a pair of angled sensing disks 22 are attached behind divider guidance wheels 21. Sensing disks 22 act much like a castor following the contours of the furrows and relaying the contour to the hydraulically actuated steering disks 32. Steering disks 32 are attached at opposite ends of cross bar 11 by hydraulically pivotal disk journals 34.

A plurality of guide wheels 30 are attached to cross bar 11 via adjustable adjustable position guide wheel brackets 31 using U-bolts. The brackets are positioned at points along cross bar 11 in alignment with the furrows. If desired, guide wheels 30 can be mounted using adjustable height hydraulic struts so the height of the machine can be adjusted with less manual labor. Both the shank spacing and the guide wheel spacing is determined by the particular drill row spacing of the field.

While there is shown and described the present preferred embodiment of the invention, it is to be distinctly understood that this invention is not limited thereto but may be variously embodied to practice within the scope of the following claims.

I claim:

1. An apparatus for cutting and windrowing vine crops which comprises:

a push type windrower having a vine pickup reel defining the swath path width between right and left sides of the windrower;

a cross bar being suspendedly attached below and behind the vine pickup reel and disposed generally parallel thereto;

a plurality of shank members being fixed at adjustable positions to the cross bar and extending generally forward and slightly downward, each terminating at a front end at a point in front of and below the pickup reel;

a plurality of cutting blades, each being attached to one of the plurality of shank members at its front end and extending horizontally therefrom;

a pair of row dividers, one of which is attached to the right side of the windrower and other to the left side, both being disposed angularly downward and having a lower end positionable below and forward of the pickup reel; and guidance and support means being attached to the cross bar for upwardly supporting and guiding the windrower.

2. The apparatus of claim 1 wherein the guidance and support means comprises a pair of elongated skids being attached to the cross bar and disposed in parallel spaced relation, one to the other, to ride in the trough of a furrow and to help support the weight of the windrower.

3. The apparatus of claim 2 wherein the row dividers comprise:

a pair of hinged divider support frames being pivotally attached to the windrower;

a pair of separator members each having an upper and a lower end with the upper ends being attached to one of the hinged divider support frames;

a pair of skid plates, each being attached at a lower end of the separator members;

a pair of rollers each having an upper end and a lower end being rotatably attached to one of the skid plates, the rollers being held in generally parallel spaced relation to the adjacent separator members; and a pair of hydraulic motors, each being operably attached to the upper end of one the rollers for rotating the same.

4. In combination with a push type windrower having a vine pickup reel defining the swath path width between right and left sides of the windrower, a vine cutting apparatus which comprises:

a cross bar being suspendedly attached below and behind the vine pickup reel and disposed generally parallel thereto;

a plurality of shank members being fixed at adjustable positions to the cross bar and extending generally forward and slightly downward, each terminating at a front end at a point in front of and below the pickup reel;

a plurality of cutting blades, each being attached to one of the plurality of shank members at its front end and extending horizontally therefrom;

a pair of row dividers, one of which is attached to the right side of the windrower and other to the left side, both being disposed angularly downward and having a lower end positionable below and forward of the pickup reel; and guidance and support means being attached to the cross bar for upwardly supporting and guiding the windrower.

5. The apparatus of claim 4 wherein the guidance and support means comprises a pair of elongated skids being attached to the cross bar and disposed in parallel spaced relation, one to the other, to ride in the trough of a furrow and to help support the weight of the windrower.

6. The apparatus of claim 5 wherein the row dividers comprise:

a pair of hinged divider support frames being pivotally attached to the windrower;

a pair of separator members each having an upper and a lower end with the upper ends being attached to one of the hinged divider support frames;

a pair of skid plates, each being attached at a lower end of the separator members;

a pair of rollers each having an upper end and a lower end being rotatably attached to one of the skid plates, the rollers being held in generally parallel spaced relation to the adjacent separator members; and a pair of hydraulic motors, each being operably attached to the upper end of one the rollers for rotating the same.

* * * * *